United States Patent [19]
Valleix

[11] Patent Number: 4,776,662
[45] Date of Patent: Oct. 11, 1988

[54] STRUCTURE FOR OPTICAL CONNECTIONS

[76] Inventor: Paul Valleix, 75 Rue Olivier de Serres, 75015 Paris, France

[21] Appl. No.: 903,691

[22] Filed: Sep. 4, 1986

[30] Foreign Application Priority Data

Sep. 6, 1985 [FR] France .................................. 8513245

[51] Int. Cl.$^4$ .............................................. G02B 6/26
[52] U.S. Cl. ................................................ 350/96.20
[58] Field of Search ................. 350/96.20, 96.21, 96.22

[56] References Cited

U.S. PATENT DOCUMENTS

| 4,332,435 | 6/1982 | Post | 350/96.22 X |
| 4,502,754 | 3/1985 | Kawa | 350/96.20 |
| 4,585,303 | 4/1986 | Pinsard et al. | 350/96.21 X |

FOREIGN PATENT DOCUMENTS

| 0055231 | 6/1982 | European Pat. Off. . |
| 0149250 | 7/1985 | European Pat. Off. . |
| 2515466 | 4/1983 | France . |
| 2517076 | 5/1983 | France . |
| 2566756 | 1/1986 | France . |
| 58-62605 | 4/1983 | Japan | 350/96.20 |
| 85/04960 | 11/1985 | World Int. Prop. O. . |

OTHER PUBLICATIONS

Runge et al., "Demountable Single-Fiber Optic Connectors and Their Measurement on Location", *The Bell System Technical Journal*, vol. 57, No. 6, Jul.-Aug. 1978, pp. 1771-1790.

Primary Examiner—John D. Lee
Attorney, Agent, or Firm—Pearne, Gordon, McCoy & Granger

[57] ABSTRACT

A structure for optical connections comprises parallel, elongated, supports. Each support carries on one face a row of optical connecting boxes and on the other face, level with each box, a first guide for guiding the optical linking fibers for connecting the boxes, and a second guide for guiding these fibers, connecting the supports and positioned facing boxes of the same level in said supports, the first guide enabling the linking fibers to traverse the supports both lengthwise and widthwise. Such a structure makes it possible to establish links from telecommunications centers or exchanges to users.

12 Claims, 6 Drawing Sheets

STRUCTURE FOR OPTICAL CONNECTIONS

BACKGROUND OF THE INVENTION

The present invention relates to a structure for optical connections. It is more particularly used in optical fiber, multiple function telecommunications networks (particularly for the function of distributing television signals).

The production of a network of this type renders commonplace the optical fibers of an optical cable leading to a telecommunications center or station, called "incoming cable", each optical fiber of said cable having to be usable for transmission links between centers, for professional use links (broad band, high flow rate links) and for video-communications links. This makes it necessary to find a structure permitting total accessibility, i.e. the connection between any random fiber of the cable and any random equipment of the center and more generally between any random fiber of a first optical cable and any random fiber of a second optical cable (each of these cables being an incoming cable or a cable leading to an equipment), as well as the possibility of creating, eliminating or transfering a link relative to an optical fiber at any time and without any deterioration of the other optical fibers.

A structure called a "connection rack" is already known, which serves to connect optical cables for certain optical links and which is e.g. marketed by CIT ALCATEL under reference BR 10. However, this structure is unsuitable for the networks envisaged hereinbefore, which require a structure having great possibilities for joining optical cables and optical fibers. However, the known structure lacks a flexibility of use. In this known structure, the possibility of joining the cables leading to it are very limited and lead to accumulations of such cables, whilst the possibility for joining optical fibers virtually does not exist.

SUMMARY OF THE INVENTION

The present invention aims at obviating these disadvantages by proposing a structure which is well adapted to the aforementioned networks.

More specifically, the present invention relates to a structure for optical connections, wherein it comprises substantially parallel, elongated supports, each of which carries on one face on one side a row of optical connecting boxes extending along the length of the support, each box being provided with a plurality of optical connecting means for connecting optical fibers and located on said side, and on the other face, level with each box, first means for guiding the connecting optical fibers for optically connecting the connecting means to one another and second means for guiding these connecting fibers, linking the supports and placed in the vicinity of the other side thereof facing the boxes of the same level in said supports, the first guidance means serving to permit the linking fibers to pass through the supports substantially longitudinally and transversely, from the boxes of said supports, so as to be able to pass up to boxes of different supports via second guidance means.

As a result of its design, the structure according to the invention has a great flexibility of use and offers considerable possibilities for joining optical fibers and cables. Thus, bearing in mind the use of rows of connecting boxes and said first guidance means, it makes it possible to "spread out" in space the path of the cables and optical linking fibers and preventing the accumulation thereof.

The structure according to the invention is also advantageous because it is modular. It is always possible to modify by adding or removing the number of supports, as well as the number of connecting boxes in a given support.

Preferably, as each box is intended for the spreading out of the optical fibers of an optical cable leading to said box, it comprises an orifice for the entry of the cable and at least one drum having a radius permitting the winding up of the cable fibers.

Each box may only have a very limited number of drums, namely a maximum of one or two drums, which is adequate, simpler and less costly than the boxes used in the BR 10 structures, in while there is a unitary reserve of optical fibers, each box having the same number of drums as there are optical fibers in the cable leading to said box.

Preferably, each support also comprises on the face carrying the boxes and on the side opposite thereto, a row of reception drums extending parallel to the row of boxes for receiving the cables, certain of these drums being displaceable parallel to the row of boxes.

As will be shown hereinafter, the use of displaceable drums is advantageous because it makes it possible to intervene in a connecting box, in the case of optical fibers breaking therein, without losing a considerable length of the cable leading to said box.

Also in preferred manner, each support comprises means for returning linking fibers from one face to the other of the support, said return means being located in the vicinity of the optical connecting means and have a curvature compatible with the diameter of the linking fibers. This obviates the problem of the brittleness or weakness of the optical fibers.

In order to protect optical fibers passing from one face to the other of the support, the return means preferably have grooves or slots for guiding the linking fibers when they pass from one face of the support to the other.

In an advantageous embodiment of the structure according to the invention, it also comprises at least one auxiliary box fixed to a support, to the other face thereof and to the level of a connecting box, each auxiliary box serving to open out the optical fibers of another optical cable leading to said auxiliary box and having an orifice for the entry of the other cable, a drum having a radius permitting the winding up of the optical fibers of the other cable and openings for the exiting of these fibers respectively in the direction of the connecting box and first guidance means corresponding to the other connecting boxes adjacent to said connecting box.

This makes it possible to reduce the attentuation of the signals transmitted by the optical fibers of the other cable, when said fibers are connected to fibres of the boxes. Thus, a fiber of the other cable can then be connected to a fibre of a box by a single connecting means, whereas if the other cable was spread out in a box, the connection in question would necessitate the use of a linking optical fiber and therefore to connecting means.

Preferably, the support has an opening in the vicinity of the auxiliary box, said opening permitting the passage of the other optical cable. This makes it possible to lead the other cable to the face of the support carrying the connecting boxes and the cables leading to said boxes, the other cable then traversing the opening to lead to the auxiliary box.

Finally, in a particular embodiment of the structure according to the invention, it also comprises at least one wavelength multiplexing means, having an input which is optically coupled to an optical connecting means of a connecting box and several outputs for optical coupling to optical fibers.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
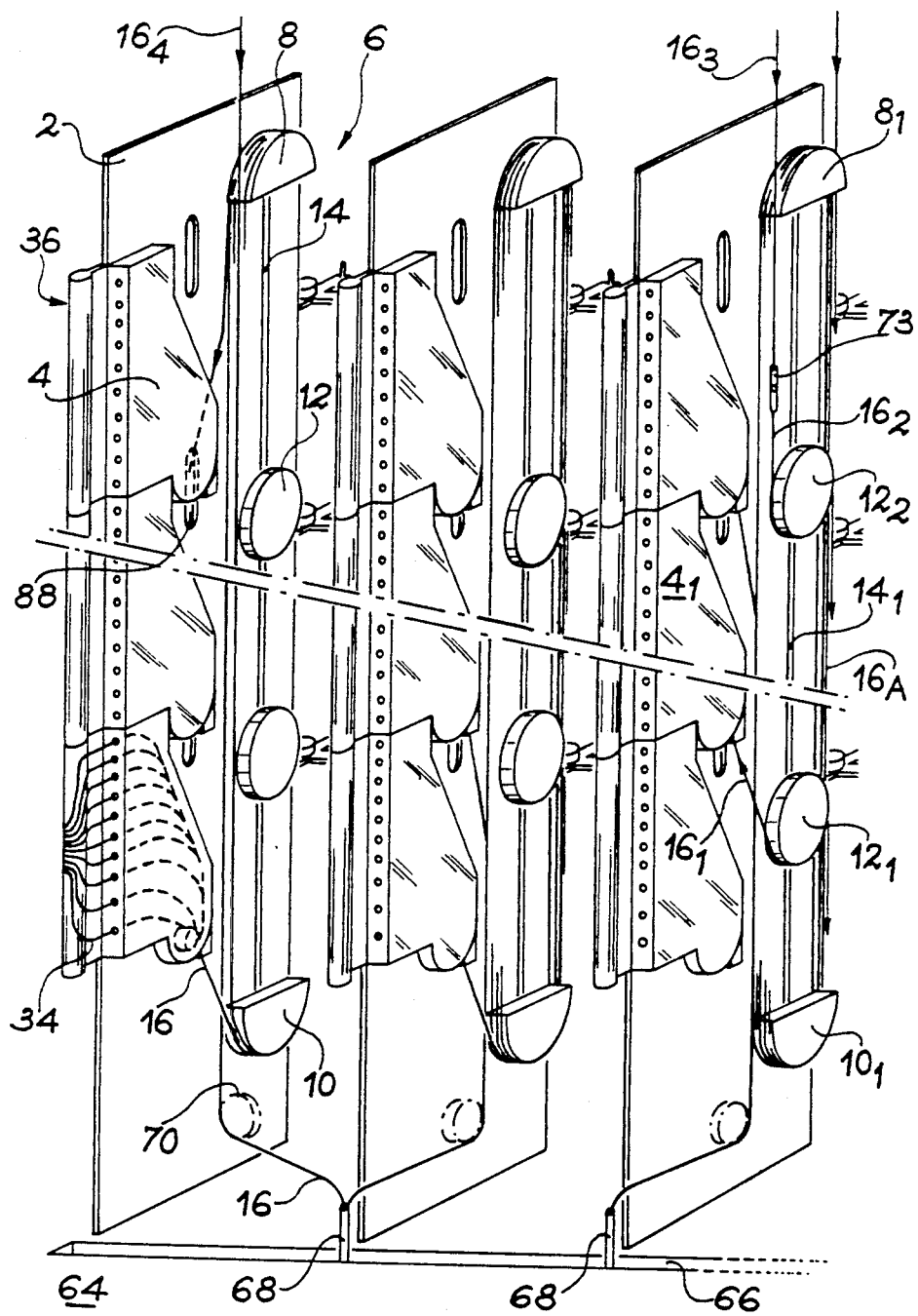
FIG. 1 A diagrammatic view of an embodiment of the structure according to the invention seen from one side.
Figure 2:
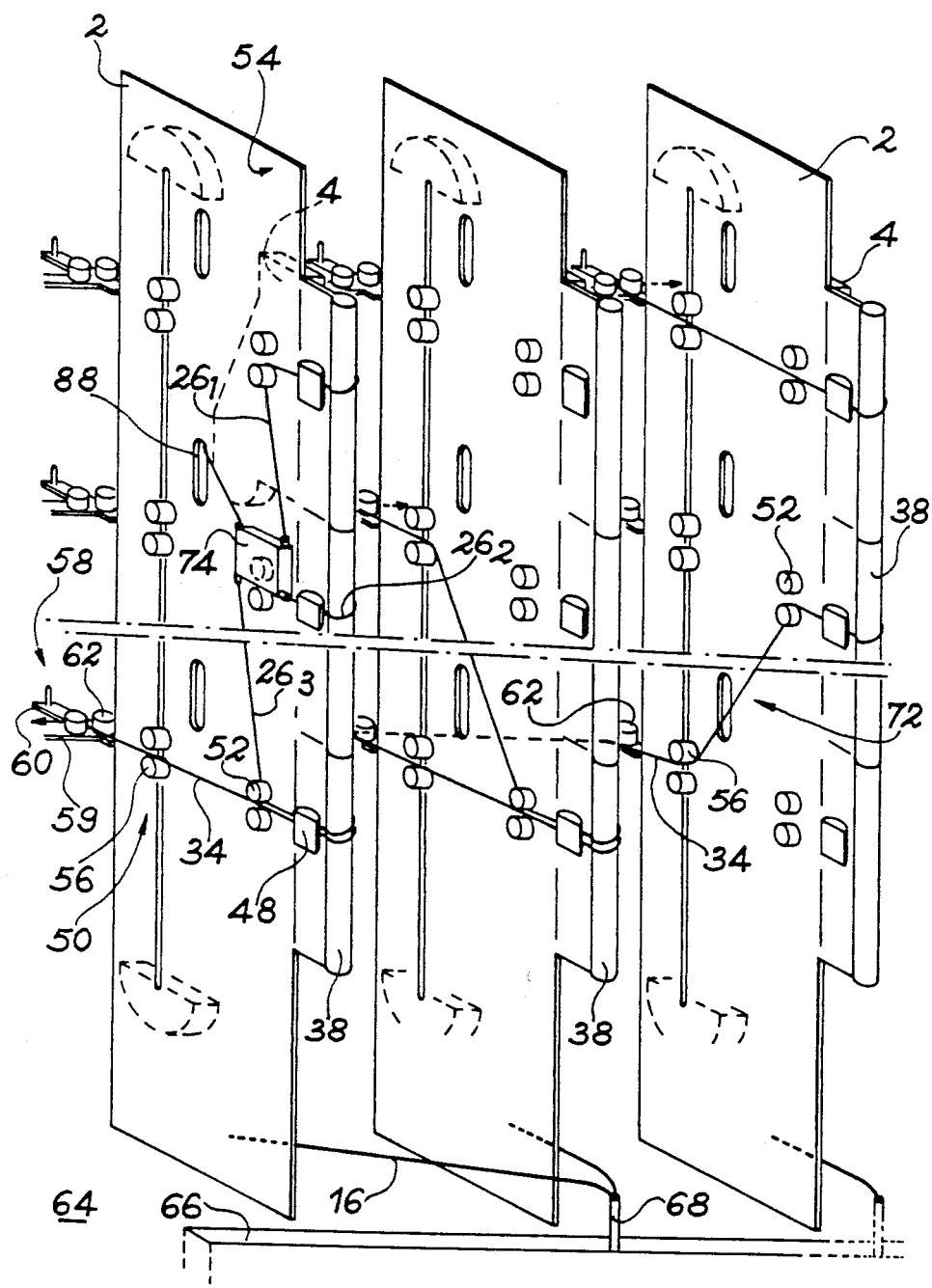
FIG. 2 A diagrammatic view of the structure shown in FIG. 1 seen from the other side.

FIGS. 1 and 2 diagrammatically show a special embodiment of the structure according to the invention comprising a row of parallel supports 2. These supports are constituted by elongated plates, which are generally arranged vertically, but which would also be arranged in any other direction. The vertical arrangement of these plates facilitates the description of the structure according to the invention, which can then use such terms as top, bottom, left and right.

By using this vertical arrangement of plates 2, FIG. 1 shows the front face of the structure seen from the right-hand side, whilst FIG. 2 shows said front face seen from the left-hand side. Each of the plates 2 is provided with boxes, drums, return means and guidance means, to be described hereinafter, the relative arrangement of these components being identical for each of the supports.

The right-hand face of each support 2, seen from the front of the structure, is provided with a vertical row of optical connecting boxes 4 stacked at the front of the support 2, and a vertical row of drums 6 which are superimposed towards the rear of the support 2, said row of drums being defined by an upper drum 8 and a lower drum 10. The connecting boxes 4 are more commonly called "optical heads" or "cable ends". The upper drum 8 is fixed with respect to plate 2 and positioned above the highest optical head, whilst the lower drum 10 is fixed with respect to plate 2 and positioned below the lowest optical head. The other drums 12 are vertically displaceable with respect to plate 2. For this purpose, an elongated vertical slot 14 can be made in said plate 2, from drum 8 to drum 10, each mobile drum 12 then being provided with a not shown locking system, making it possible to maintain it at an appropriate position to be defined hereinafter with respect to plate 2. For example, the locking system comprises a screw passing through slot 14 from the left-hand face of plate 2, seen from the front of the structure, to be screwed into an appropriate tapped hole of drum 12, the screw head then bearing against said left-hand face.

The different optical cables used in the structure according to the invention are single core cables and multiple core cables having several single core cables, each of the latter having several optical fibers, namely ten in the represented embodiment.

Each optical head 4 for receiving a single cable 16 is constituted by an elongated box permitting the stacking of all the optical heads corresponds to the same support 2. Each box 4 has a front face 18 (FIG. 5), which is elongated and planar, so that the optical heads of the same support, positioned one above the other, have their front faces 18 in the same vertical plane. Towards the rear of its lower portion, each optical head 4 has an orifice 20 for the entry of the single core cables 16 in said head, which is also provided with a device 22 permitting the penetration and locking of the single core cable. A drum 24 is fixed within box 4 in the vicinity of orifice 20. When the box is fixed to its support 2, the axis of drum 24 is horizontal. Within box 4, the ten optical fibers 26 of the single core cable 16 are spread out and wound onto drum 24, which thus constitutes an optical fiber reserve. The radius of drum 24 is obviously adapted to the size of the optical fibers. In other words, it is sufficiently large to prevent any breaking of an optical fiber when it is wound onto said drum.

Optical connectors 28 (FIG. 3) in a number equal to that of the fibers of cable 16 and ten in the given embodiment, are fixed to the outside of optical head 4 against its front face 18 and along said face, said face being provided with an opening 30 facing each connector. Following their winding onto drum 24, the fibers 26 spread out in optical head 4 and are respectively optically connected to connectors 28 after passing through openings 30.

In a variant, optical head 4 has a supplementary inner drum 32 identical to drum 24 and positioned vertically of the latter, a certain number of optical fibers of cable 16, five in the given example, then being wound onto drum 24, whilst the other optical fibers are wound onto the other drum 32.

Figure 3:
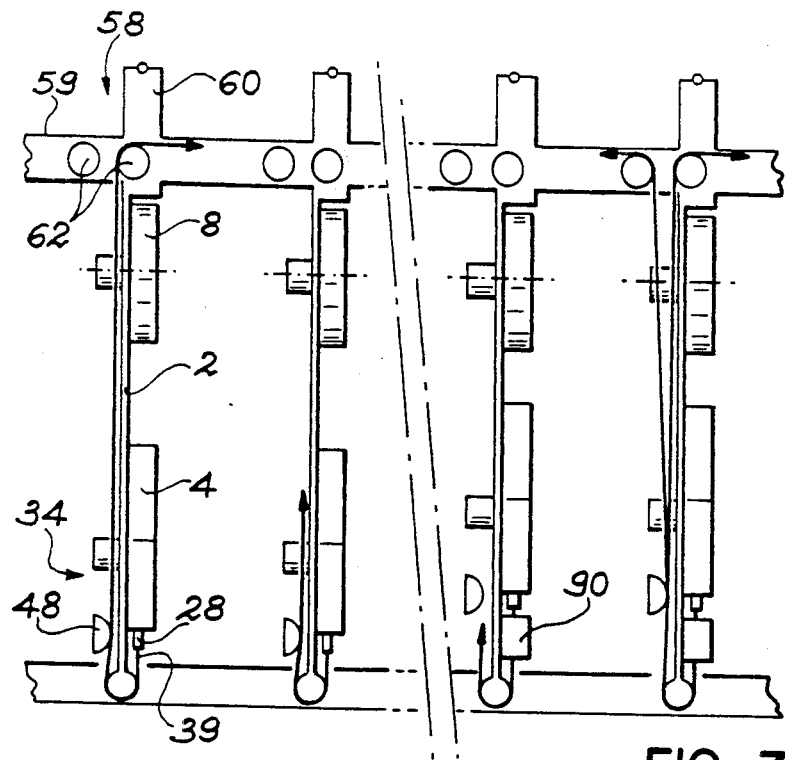
FIG. 3 A diagrammatic plan view of said structure.

In the structure according to the invention, optical linking fibers 34 are provided so as to be connected to fibres 26 via connectors 28. Each plate 2 is provided with a means 36 for returning the linking fibers from one face to the other of said plate. These return means are in the from of a column, which is vertically fixed to the front of plate 2 facing the row of connectors, which is obtained following the superimposing of corresponding optical heads. Column 36 can be obtained by superimposing e.g. tubular, cylindrical elements 38, each element or tube 28 being fixed to a given optical head 4 (FIG. 5), parallel to the front face 18 thereof and via a planar plate 40, which extends the left-hand side face 42, which is assumed to be planar, of the optical head. Thus, tube 38 is fixed to plate 40 in such a way that the corresponding connectors 28 are set back from said tube, which protects them from structure users. In addition, tube 38 is fixed to plate 40 in such a way that the portions 39 of the optical fibers outside head 4 and respectively linked with the connectors thereof are substantially in the axis of the connectors (FIG. 3).

Grooves 44, whereof the number exceeds that of the connectors 28 of head 4 are provided on tube 38 and can have a depth of approximately 3 mm. For example, there are twice as many grooves as there are connectors. Each groove 44 has a horizontal portion 45 facing an opening 30. On passing from the right-hand to the left-hand of the corresponding plate 2, the grooves converge, following said portions 45, towards the central part of tube 38 and finally have horizontal parts on the side of the left-hand side face 42. The function of grooves 44 is to guide the optical fibers, such as fibres 34, in their passage from one face to the other of plate 2.

A plurality of slides 46 is provided on plate 40 (FIG. 5) facing the optical head connectors, so as to be able to fix wavelength multiplexers, to be described hereinafter, respectively facing connectors 28.

These connectors are protected against the comings and goings set back from columns 36. Thus, the latter protect the connectors, maintain the fibers linked with said connectors in the axis of the latter and protect these fibers against shocks as a result of the curved grooves in which the fibers travel.

A guidance member 48 (FIGS. 2 and 3) is also fixed e.g. by its lower an dupper ends to the left-hand side face 42 of each optical fiber 4 level with the central portion of tube 38. Member 48 is curved facing face 42 and its function is to guide the fibers from connectors 28, when said fibres leave grooves 44 to then pass between member 48 and face 42.

To the left-hand face 54 of each plate 2 (viewed from the front) are fixed first guidance means 50 level with each optical head 4. These guidance means have the function of permitting the optical fibers, after passing from the right-hand to the left-hand face of plate 2, to travel in the horizontal or vertical direction. These guidance means 50 are e.g. constituted by two horizontally axed cylindrical parts 52, which are fixed one above the other with a gap between them towards the front of plate 2, facing the guidance member 48 and two other parts 56, identical to parts 52 and having horizontal axes, being fixed to the left-hand fact 54 towards the rear of plate 2 with said gap between them and in such a way that a part 52 and a part 56 have their axes in the same horizontal plane and the other part 52 and the other part 56 also have their axes in the same horizontal plane.

Finally, the structure shown in FIGS. 1 and 2 also comprises second guidance means, also called "connecting wire beds". Each of the second guidance means 58 comprises an elongated plate 59 horizontally connecting the different plates 2 and fixed thereto via supports 60, substantially level with a guidance member 48. In correspondence with each plate 2, two vertically axed cylindrical parts 62 are fixed to plate 59 with a gap between them, so that one of the parts 62 is in the extension of tube 38 on considering the plate from front to rear, whilst the other part 62 is mounted to the left of the preceding part 62 (FIG. 3).

After an optical fiber such as 34 has passed from the right-hand face to the left-hand face of plate 2, it passes between plate 40 and guidance part 48 and then between the two parts 52 and from these can pass between the two parts 52 or the two immediately lower or immediately upper parts 56, if they exist. After passing between the two parts 52, it can also pass between parts 56 of the same, a lower or a higher level (if they exist) and then between the two parts 62 corresponding to said parts 56 so as to continue its path along the associated plate 59, towards the left or right thereof when this is possible (FIGS. 2 and 3).

A few examples will now be given of optical connections which can be produced with the aid of the structure shown in FIGS. 1 and 2. This structure rests on a floor 64. An opening 66 extending parallel to the row of plates 2 is made in said floor 64 and enables the multiple core cables 68 to reach said structure. Obviously, cable 68 could also arrive by the top of said structure. Level with the opening 66, each multiple core cable 68 is fixed to floor 64, earthed and spread out or divided into the different single core cables 16 forming it and these cables 16 are provided with protective means. As a function of the optical connections which it is wished to obtain, each cable 16 is oriented towards a given plate 2 and then wound onto the two corresponding drums 8, 10, whilst firstly passing on to the drum 8 before passing on to the drum 10 and effecting several turns during said winding operation, so as to form a cable reserve.

Prior to winding, cable 16 passes into a guide 70 fixed to the considered support 2 towards the bottom thereof. The function of this guide is to maintain that part of cable 16 which emerges from opening 66 in the vicinity of the corresponding support 2, whilst permitting the tensioning of cable 16 at the start of its winding. When cable 16 has undergone several turns on drums 8 and 10, it can then lead to the desired optical head 4.

Cable 16 is then opened out in optical head 4 and the optical fibers corresponding thereto are respectively connected to the connectors of said optical head. It is then possible to connect the optical linking fibers 34 to the different connectors and ensure that each optical linking fiber takes a path using the various first guidance means of the considered plate 2 and then the second appropriate guidance means and finally the first guidance means of another plate 2 carrying another optical head 4 to one of the connectors of which it is wished to connect the optical linking fiber.

Examples of such paths are given in a purely indicative and non-limitative manner in FIG. 2. Thus, it is possible to envisage a path 72 in which the linking fiber 34 from a given box 4 passes round the corresponding tube 38, passes between the two parts 52 associated with said box 4 and then between the two parts 56 associated with the immediately lower box 4, then between the two parts 62 from which it passes obliquely to the left to pass between the two parts 62 associated with the plate immediately to the left of the preceding plate, then between the corresponding parts 56 and 52 so as to finally pass round tube 38 associated with said parts, followed by the connection to a given connector of the corresponding box 4.

In order to spread out in space the path of the cables and optical linking fibers, whilst avoiding accumulations, it is possible to respect the following rule. Starting with the optical head which is furthest to the left (seen from the front face), each linking fiber firstly performs its vertical path if necessary for reaching the height of the optical head to which it must lead and this is followed by its horizontal path.

The function of the mobile drums 12 will now be described. When one or more optical fibers of a given single core cable $16_1$ are broken in an optical head $4_1$, cable $16_1$ is extracted from optical head $4_1$ and a mobile durm $12_1$ is placed in slot $14_1$ corresponding to optical head $4_1$ and the rear part $16_4$ of cable $16_1$ is passed above the mobile drum $12_1$ (instead of passing it over the corresponding lower drum $10_1$). This is followed by making the necessary connections of the optical fibers in the optical head $4_1$ by cutting, if necessary, part of the end of cable $16_1$, said end leading to box $4_1$ and finally mobile drum $12_1$ is moved downwards until the desired tension for the cable is maintained and the drum $12_1$ is immobilized. Thus, a mobile drum makes it possible to act again on an optical head, whilst keeping the corresponding cable 16 taut and without losing all the length of said cable corresponding to a double height of plate 2.

FIG. 1 also shows an earth splice 73 making it possible to connect a single core cable $16_2$ from a multiple core cable 68 from floor 64 to a single core cable $16_3$ passing down towards the structure according to the invention from the not shown ceiling of the room in which said structure is located. The earth splice 73 is obtained by placing end to end and then welding each fiber of cable $16_2$ to a chosen fiber of cable $16_3$. To carry out this particular connection, a mobile drum $12_2$ is placed in the appropriate groove, the earth splice is carried out, cable $16_2$ is passed through and then passes down from the upper drum corresponding to said groove beneath the mobile drum $12_2$ which is then moved downwards in such a way that cables $16_2$ and $16_3$ are taut and it is then immobilized.

Figure 4:
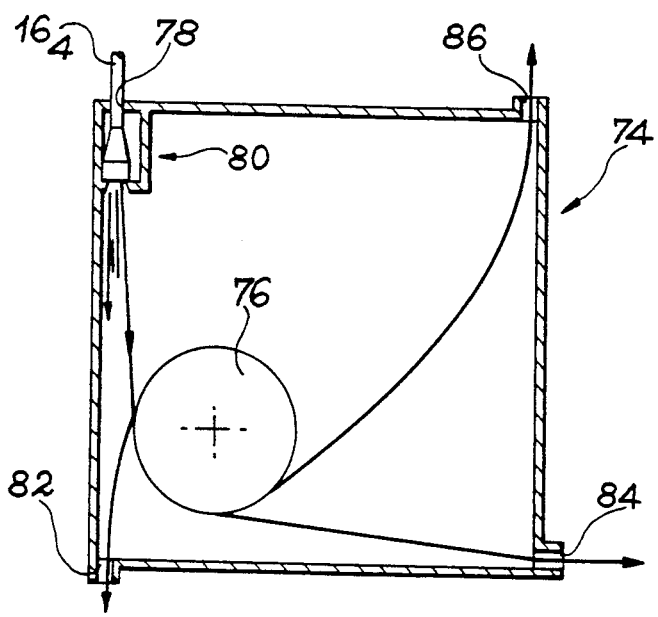
FIG. 4 A diagrammatic view of an auxiliary box usable in the structure shown in FIGS. 1 to 3.

For certain cables, such as the single core cable $16_4$ called the "exploded installation cable" and coming from a not shown equipment of the station or center with which is associated the structure represented in FIGS. 1 and 2, it may be necessary to as far as possible avoid optical attenuations during connections of cables and therefore the number of optical connectors used for these connections. To this end, use is made of an auxiliary box 74 called an "explosion box" (FIGS. 2 and 4). Box 74 is fixed, at an appropriate level, to the left-hand face of a support 2 and, if it exists, preferably the support 2 having most of the connectors to which the fibers of cable $16_4$ have to be connected, in order to as far as possible limit the path of these fibers.

The auxiliary box 74 is e.g. parallepipedic and has in its interior a horizontally axed drum 76, when drum 74 is mounted on its support 2. Box 74 has an orifice 78 for the entry of cable $16_4$, as well as a device 80 permitting the penetration and locking of the cable in box 74. Following the penetration of said box, the cable is spread out into optical fibers, which are wound several times onto drum 76, which therefore forms an optical fiber reserve, said drum having a sufficiently large radius so as to not damage the optical fibers wound onto it. Drum 74 also has three orifices 82, 84, 86 permitting the exit of the fibers following their winding onto the drum. Orifices 78, 82, 84, 86 are e.g. arranged at the four corners of box 74.

As can be seen in FIG. 2, box 74 is fixed to the left-hand face of the chosen support 2, e.g. in place of an upper part 52. Each support 2 is provided with a vertical row of elongated openings 88, said row passing between the line defined by parts 52 and the line defined by the parts 56 of the support. This makes it possible to wind cable $16_4$ onto the upper and lower drums of the corresponding support 2 in order to constitute a cable reserve and then to pass the latter through the closest opening 88 of box 74 before leading it up to said box. On leaving box 74 by the orifices provided for this purpose, the fibers such as $26_1$, $26_2$ and $26_3$ of cable $16_4$ can be passed to the boxes chosen for their connection via appropriate guidance means. It can be seen in FIGS. 2 and 4 that box 74 is fixed to the left-hand face of support 2, in such a way that the orifice 78 corresponding to cable $16_4$ is turned upwards and towards the rear of support 2, which makes it possible to pass the optical fibers from cable $16_4$ to the optical head located at the same level as box 74 or towards the first guidance means 50 corresponding to the optical heads adjacent to the preceding head.

Thus, as a result of the auxiliary box 74, the connection of one fiber of cable $16_4$ is brought about by using a single connector, whereas two would have been needed if cable $16_4$ was led to an optical head and use was made of optical linking fibers.

Figure 6:
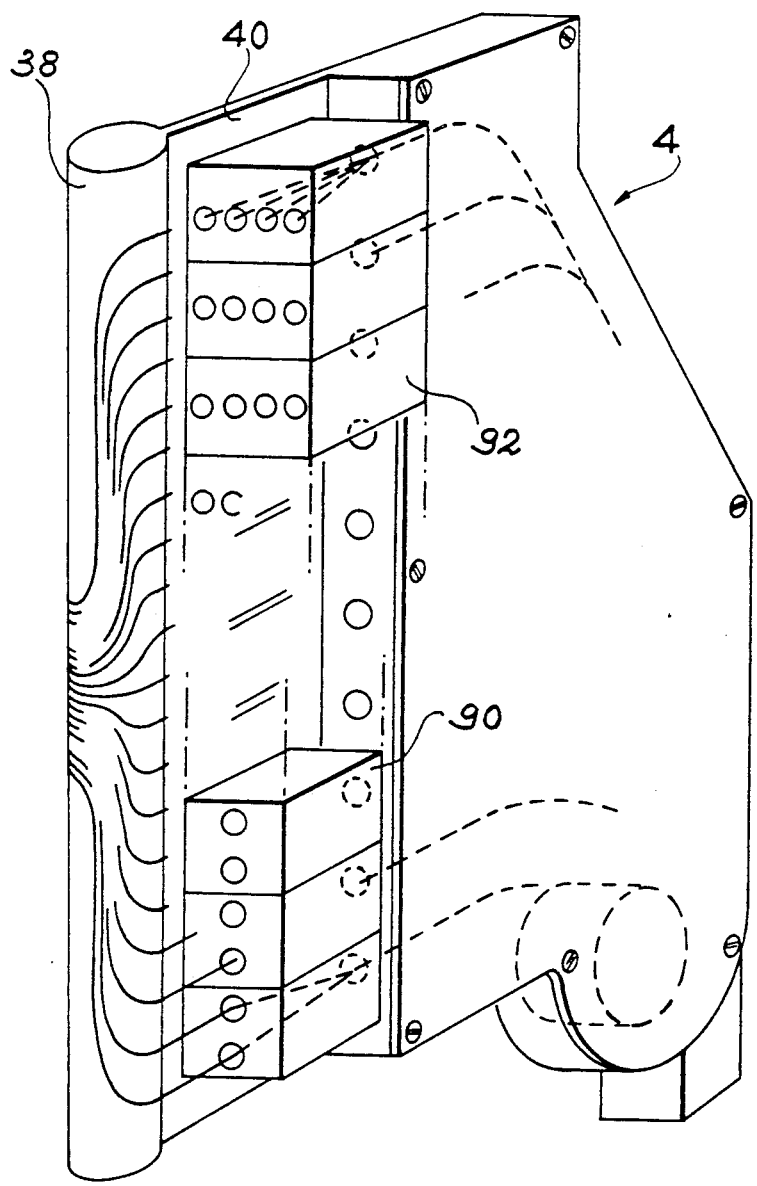
FIG. 6 Wavelength multiplexing means usable with these boxes.

FIG. 6 shows an optical head 4 provided with several wavelength multiplexers 90, 92, which are joined to the optical head via the aforementioned slides. These multiplexers are used when it is wished to separate signals of different wavelengths, transmitted by one or more optical fibers of the cable leading to said optical head. The appropriate multiplexer or multiplexers are then mounted facing the connector or connectors of the head corresponding to said fiber or fibers.

For example, for a fiber transmitting signals of respective wavelength $\lambda_1$, and $\lambda_2$, in front of the corresponding connector is mounted a multiplexer such as 90, having an input optically connected to said connector and two outputs to which can be respectively connected two optical linking fibers or two fibers from an auxiliary box, which then respectively transmit a light beam of wavelength $\lambda_1$ and a light beam of wavelength $\lambda_2$.

For another fiber transmitting leight beams of respective wavelength $\lambda_1$, $\lambda_2$, $\lambda_3$ and $\lambda_4$, in front of the corresponding connector is mounted a multiplexer such as 92 having an input optically connected to said connector and four outputs to which it is possible to respectively connect optical linking fibers or fibres from the auxiliary box, said fibres then transporting light beams of respective wavelengths $\lambda_1$, $\lambda_2$, $\lambda_3$ and $\lambda_4$.

FIG. 3 shows that the fibers from a multiplexer can obviously take different directions on second guidance means 58. Moreover, facing each connector is preferably provided a number of grooves 44 equal to the maximum number of outputs of multiplexers liable to be installed on the optical heads.

Figure 5:
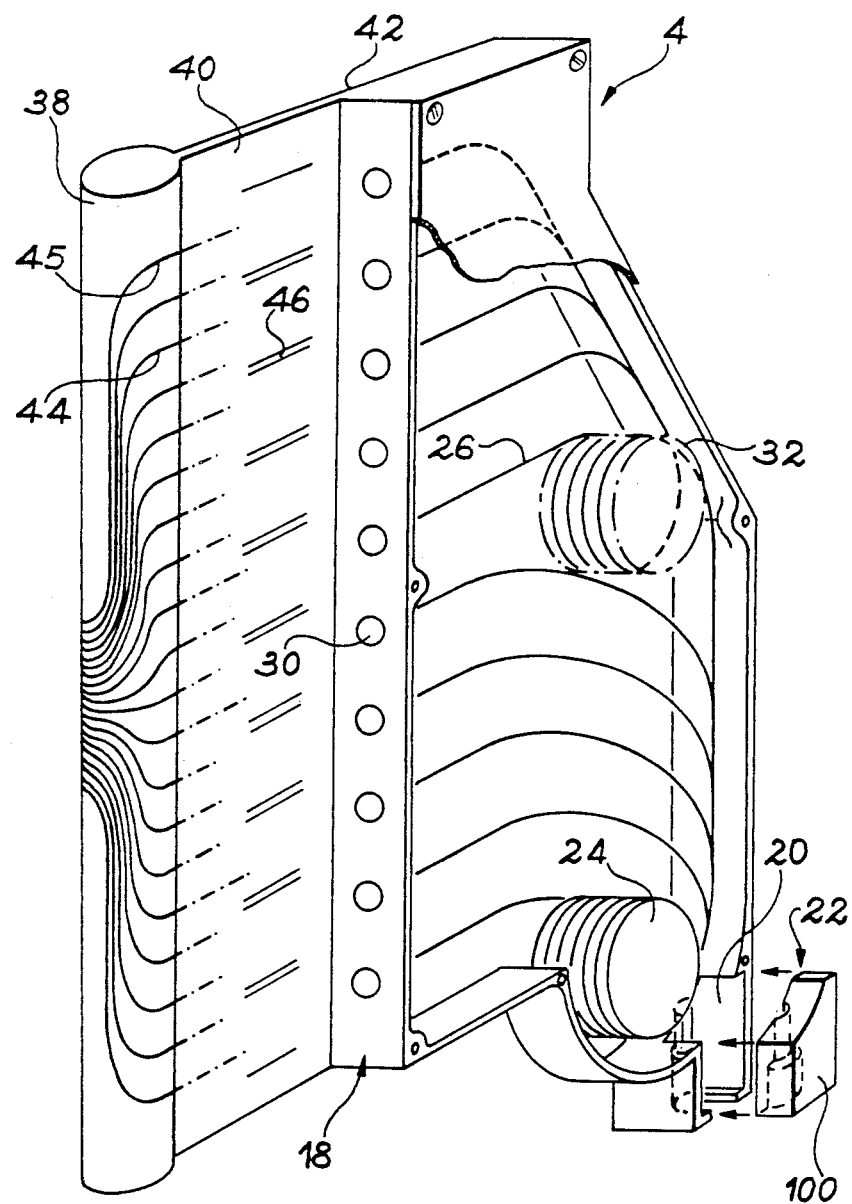
FIG. 5 A diagrammatic view of a special embodiment of optical connecting boxes used in this structure.
Figure 7:
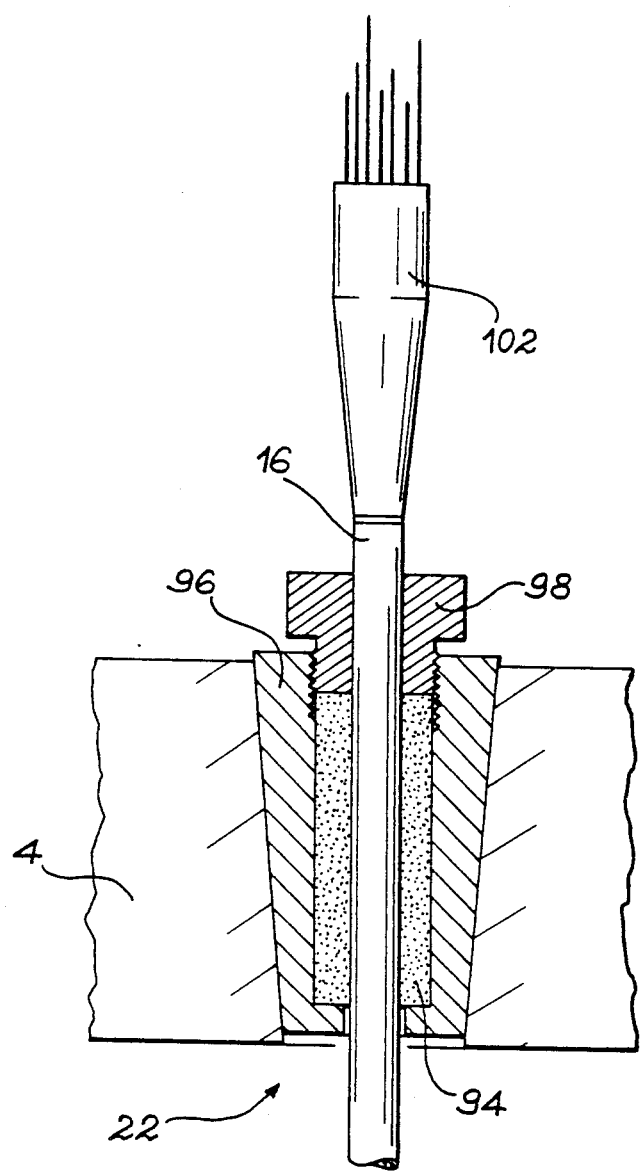
FIG. 7 A device making it possible to hold in place the optical cables leading to said boxes.

In FIGS. 5 and 7 are shown device 22 permitting the penetration and locking of a cable in an optical head. This device comprises a deformable cylinder 94 placed in a packing gland cone 96, which is placed in a recess provided for this purpose in the optical head level with opening 20. Cable 16 traverses cylinder 94, as well as a screw 98, which merely has to be screwed into the packing gland cone, which is tapped or threaded for this purpose, in order to bear on cylinder 94, which then immobilizes the cable with respect to the said cone and consequently with respect to the optical head. A part 100, in which is provided a recess complimentary to that made in the optical head, then closes opening 20 (FIG. 5). This device is advantageous int hat it permits the extraction of the cable without it being necessary to separate the head from its support. A comparable device can be used for maintaining a single core cable in position with respect to an auxiliary box.

FIG. 7 also shows a device 102 for the spreading out of the optical fibers of the optical head. In known manner, said device comprises tubes of equal number to the fibers and through which the latter pass.

Obviously, the structure according to the invention could have several parallel rows of supports 2 instead of a single row. It would then be possible to provide in the passage separating two adjacent rows a ladder moving on rails and enabling a user to position himself alongside a given support and level with a given optical head in order to make the desired optical connections there.

In an illustrative and non-limitative manner, it would be possible to have a structure with thirty supports separated by 25 cm gaps and each having ten optical heads, each associated with ten optical fibers, which would make it possible to optically connect a total of approximately 3000 optical fibers.

The structure according to the invention and which serves as an "optical distributor", has the advantage of permitting frequent interventions on the part of users, whilst adequately protecting the optical fibers thereof against the comings and goings of said users.

What is claimed is:

1. A structure for optical connections, wherein it comprises substantially parallel elongated supports having two faces each support carrying on one face, on one side, a row of optical connecting boxes extending along the length of the support, each box being provided with a plurality of optical connecting means for connecting optical fibers and located on said one side, and on the other face, level with each box, first means for guiding connecting optical fibers for optically connecting the connecting means to one another and wherein it also comprises second means for guiding these connecting fibers, said second guiding means linking the supports and being placed in the vicinity of the other side thereof facing the boxes of the same level in said supports, the first guiding means associated with each support being adapted for permitting the connecting fibers to travel through said support substantially longitudinally and transversely, from the boxes of said support to boxes of different supports via second guidance means.

2. A structure according to claim 1, wherein each box serves for the spreading out of optical fibers of an optical cable leading to said box and comprises an orifice for the entry of the cable and at least one drum having a radius permitting the winding on the fibers of the cable.

3. A structure according to claim 2, wherein each support also comprises on the face carrying the boxes and on the side opposite thereto, a row of reception drums extending parallel to the row of boxes and serving to receive the cables, some of these drums being displaceable parallel to the row of boxes.

4. A structure according to claim 1, wherein each support also comprises means for returning the connecting fibers from one face to the other of the support, said returning means being located in the vicinity of the optical connecting means and having a curvature compatible with the diameter of the connecting fibers.

5. A structure according to claim 4, wherein the returning means have grooves for guiding the connecting fibers when they pass from one face to the other of the support.

6. A structure according to claim 4, wherein said returning means are in the form of a column which is facing the optical connecting means and is fixed to the support and extends along the length thereof.

7. A structure according to claim 1, wherein it also comprses at least one auxiliary box fixed to a support, on said other face thereof and level with a connecting box, each auxiliary box being intended for the spreading out of optical fibers of another optical cable leading to said auxiliary box and having an orifice for the entry of the other cable, a drum having a radius permitting the winding on of the optical fibers of the other cable and openings for the exit of said fibers respectively in the direction of the connecting box and of the guiding first means corresponding to the other connecting boxes adjacent to said connecting box.

8. A structure according to claim 7, wherein the support to which the auxiliary box is fixed is provided with an opening in the vicinity of the auxiliary box, said opening permitting the passage of the other optical cable.

9. A structure according to claim 1, wherein the supports are constituted by elongated plates.

10. A structure according to claim 1, wherein the first guidance means of each support comprise at the level of each box of said support, a guide means which is fixed to the said other face of said support towards the said one side thereof and another guide means which is fixed to the said other face of said support towards the other side thereof.

11. A structure according to claim 1, wherein each second guidance means comprise an elongated plate which connects the supports transversely to the length thereof and which is fixed to said supports, and guide means which are fixed to the said elongated plate in correspondence with the respective supports.

12. A structure for optical connections, wherein it comprises substantially parallel elongated supports having two faces each support carrying on one face, on one side, a row of optical connecting boxes extending along the length of the support, each box being provided with a plurality of optical connecting means for connecting optical fibers and located on said one side, and on the other face, level with each box, first means guiding connecting optical fibers for optically connecting the connecting means to one another and wherein it also comprises second means for guiding these connecting fibers, said second guiding means linking the supports and being placed in the vicinity of the other side thereof facing the boxes of the same level in said supports, the first guiding means associated with each support being adapted for permitting the connecting fibers to travel through said support substantially longitudinally and transversely, from the boxes of said support to boxes of different supports via second guidance means wherein said structure also comprises at least one wavelength multiplexer having an input optically coupled to an optical connecting means of a connecting box and several outputs for optical coupling to optical fibers.

* * * * *

UNITED STATES PATENT AND TRADEMARK OFFICE
CERTIFICATE OF CORRECTION

PATENT NO. : 4,776,662
DATED : October 11, 1988
INVENTOR(S) : Paul Valleix

It is certified that error appears in the above-identified patent and that said Letters Patent is hereby corrected as shown below:

Column 2, line 17, "while" should read --which--

Column 4, line 10, "corresponds" should read --corresponding--

Column 4, line 48, "from" should read --form--

Column 4, line 53, "28" should read --38--

Column 5, line 13, after "goings", the following was omitted:
 --of users of the structure according to the invention by being--

Column 5, line 19, "an dupper" should read --and upper--

Column 5, line 36, "fact" should read --face--

Column 6, line 60, "durm" should read --drum--

Column 8, line 26, "leight" should read --light--

Column 9, line 36, "the" should read --of-- (2nd occurrence)

Column 10, line 10, "guiding first" should read --first guiding--.

Signed and Sealed this

Eighteenth Day of April, 1989

Attest:

DONALD J. QUIGG

Attesting Officer

Commissioner of Patents and Trademarks